US008693574B2

(12) United States Patent
Mizuta et al.

(10) Patent No.: US 8,693,574 B2
(45) Date of Patent: Apr. 8, 2014

(54) METHOD AND APPARATUS FOR DETERMINING A PRECODING MATRIX FOR PRECODING SYMBOLS TO BE TRANSMITTED TO A PLURALITY OF WIRELESS DEVICES

(71) Applicant: NTT DoCoMo, Inc., Tokyo (JP)

(72) Inventors: Shinji Mizuta, Munich (DE); Guido Dietl, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/871,361

(22) Filed: Apr. 26, 2013

(65) Prior Publication Data

US 2013/0279628 A1    Oct. 24, 2013

Related U.S. Application Data

(63) Continuation of application No. PCT/EP2012/057809, filed on Apr. 27, 2012.

(30) Foreign Application Priority Data

Apr. 29, 2011    (EP) .................................... 11164379

(51) Int. Cl.
   *H04L 27/00*    (2006.01)
(52) U.S. Cl.
   USPC ........... 375/295; 375/260; 375/267; 370/203; 370/329; 370/332; 370/334; 370/465
(58) Field of Classification Search
   USPC .......... 375/260, 267, 295; 370/203, 210, 329, 370/332, 334, 465
   See application file for complete search history.

(56) References Cited

U.S. PATENT DOCUMENTS

| 2008/0165876 | A1 | 7/2008 | Suh et al. |
| 2009/0323563 | A1 | 12/2009 | Ho et al. |
| 2011/0064156 | A1* | 3/2011 | Kim et al. ..................... 375/295 |
| 2012/0269077 | A1* | 10/2012 | Bazzi et al. ................... 370/252 |
| 2013/0094344 | A1* | 4/2013 | Zhang et al. .................. 375/267 |
| 2013/0129011 | A1* | 5/2013 | Rheinschmitt et al. ....... 375/295 |

OTHER PUBLICATIONS

Hwang, Sung Soo, and Lee, Yong-Hwan, "Multi-beam multiplexing using multiuser diversity and random beams in wireless systems," IEEE Proc. ICC, vol. 4, pp. 2717-2721, Seoul, South Korea, 2005.
Philips, "Comparison between MU-MIMO codebook-based channel reporting techniques for LTE downlink," 3GPP TSG RAN WG1 Meeting #46bis, 10 pages, Seoul, South Korea, Oct. 9-13, 2006.
Philips, "Comparison of MU-MIMO feedback schemes with multiple UE receive antennas," 3GPP TSG RAN WG1 Meeting #47bis, 7 pages, Sorrento, Italy, Jan. 15-19, 2007.

* cited by examiner

*Primary Examiner* — Daniel Washburn
*Assistant Examiner* — Eboni Hughes
(74) *Attorney, Agent, or Firm* — Brinks Gilson & Lione

(57) ABSTRACT

In a method for determining a precoding matrix for precoding symbols to be transmitted to a plurality of wireless devices by a node of a wireless communication system the precoding matrix comprises a precoding vector for each wireless device of a plurality of wireless devices, each precoding vector having a precoding element for each transmit antenna of the node. Each precoding element represents a phase shifter for phase shifting a phase of a symbol to be transmitted. A plurality of interference strength indicators for different phase angles is calculated based on the precoding matrix. Further, for the precoding element of the precoding vector a phase angle is selected which corresponds to a calculated interference strength indicator fulfilling a predefined interference strength criterion.

15 Claims, 10 Drawing Sheets

ZF $$\hat{H}_{eff}P_{ZF} = \hat{H}_{eff}\hat{H}_{eff}^H(\hat{H}_{eff}\hat{H}_{eff}^H)^{-1}$$
$$= I$$

The product of $P_{ZF}$ an $\hat{H}_{eff}$ is always the identity matrix I.

FIG 5A proposed method $$\hat{H}_{eff}P_{CM} \longrightarrow I$$

equivalent to:

$$P_{CM} = \arg\min_{P \in \Pi} \|\hat{H}_{eff}P - I\|_F^2$$

$$\Pi = \{P \in C^{M \times D} | [P]_{i,k} = e^{j\theta_{i,k}}, \theta_{i,k} \in [0, 2\pi[\}$$

approach the product of $P_{CM}$ and $\hat{H}_{eff}$ to I

FIG 5B channel state
information

METHOD AND APPARATUS FOR DETERMINING A PRECODING MATRIX FOR PRECODING SYMBOLS TO BE TRANSMITTED TO A PLURALITY OF WIRELESS DEVICES

RELATED APPLICATIONS

This application is a continuation of PCT/EP2012/057809 filed on Apr. 27, 2012, which claims priority to the European Application No. 11164379.7 filed on Apr. 29, 2011. The entire contents of these applications are incorporated herein by reference.

BACKGROUND OF THE INVENTION

Embodiments according to the invention relate to wireless communication systems, especially wireless multiuser multiple-input multiple-output (MIMO) communications, and particularly to a method and an apparatus for determining a precoding matrix for precoding symbols to be transmitted to a plurality of wireless devices by a node of a wireless communication system.

In the down link of multiuser MIMO communications systems, precoding design and the scheduling of users are the key to achieve high capacity and low inter-user interference. A precoding method with zero forcing (ZF) is mainly used for this purpose and it can cancel out fully the inter-user interference if perfect channel state information is obtained at the transceiver.

As another precoding method to realize the constant modulus property, a precoding method of multiuser MIMO defined in Rel. 8 is available. Although this precoder has the constant modulus property, it can not adequately mitigate low inter-user interference. This is mainly because this method is based on single-user MIMO technologies and the number of precoding matrices is limited by the number of codebooks.

An example for a conventional method is a ZF precoding based on channel vector quantization (CVQ). At the eNB (evolved node B), the precoded signal $x \in \mathbb{C}^M$ is transmitted over M antennas and received by N antennas at the terminal. With the kth users' channel matrix $H_k \in \mathbb{C}^{N \times M}$ and the complex white Gaussian noise term $n_k \in \mathbb{C}^N$ (each entry has variance one), the received signal can be written as $$y_k = H_k x + n_k \quad (1)$$

In case of non-codebook based precoding at the eNB, each terminal (wireless device) provides a Channel Direction Indicator (CDI) together with a Channel Quality Indicator (CQI) via the feedback channel. Here, the CDI is an entry in the codebook (usually represented by a codebook index)

$$C = \{u_1, u_2, \ldots, u_{2^B}\} \quad (2)$$

which is obtained via Channel Vector Quantization (CVQ) of the composite channel vector $h_{\text{eff},k}^T = w_k^T H_k \in \mathbb{C}^{1 \times M}$, i.e., the combination of the channel $H_k$ and the receive filter $w_k$ at user k. Since the finally used Minimum Mean Square Error (MMSE) receive filter of user k depends on the finally chosen precoder which is not known at the time of CVQ because the channels of other users are unknown due to the non-cooperative nature of the downlink channel, the receiver needs to be estimated as described in "3GPP, R1-070346, Philips, "Comparison of MU-MIMO feedback schemes with multiple UE receive antennas"". In other words, the quantizer $Q_C$ computes not only the quantized composite channel vector $\hat{h}_{\text{eff},k}$ but also a receiver estimate $\hat{w}_k$ both depending on the type of CVQ:

$$CDI: (\hat{h}_{\text{eff},k}, \hat{w}_k) = Q_C(H_k) \quad (3)$$

Due to the fact that the channels of other users and the finally chosen precoder is not known when the feedback information is computed at a terminal, the SINR as the CQI is to be approximated by taking into account a rough estimate of the multiuser interference caused by the imperfect channel state information at the eNB due to quantization (see "3GPP, R1-070346, Philips, "Comparison of MU-MIMO feedback schemes with multiple UE receive antennas"" for details):

$$CQI: \gamma_k(\hat{h}_{\text{eff},k}, \hat{w}_k, H_k) = \frac{\frac{P_{Tx}}{M} \|H_k^T \hat{w}_k\|_2^2 \cos^2 \theta_k}{1 + \frac{P_{Tx}}{M} \|H_k^T \hat{w}_k\|_2^2 \sin^2 \theta_k}, \quad (4)$$

$$\cos \theta_k = \frac{|\hat{h}_{\text{eff},k} H_k^T \hat{w}_k|}{\|H_k^T \hat{w}_k\|_2}$$

Whereas the CQI values are used at the eNB to schedule the users in a greedy way as described in 23GPP, R1-070346, Philips, "Comparison of MU-MIMO feedback schemes with multiple UE receive antennas"" and "3GPP, R1-062483, Philips, "Comparison between MU-MIMO codebook-based channel reporting techniques for LTE downlink"" and to choose the proper MCS (Modulation and Coding Scheme), the CDIs are used to generate the composite channel matrix $\hat{H}_{\text{eff}} \in \mathbb{C}^{D \times M}$ with rows according to the quantized composite channel vectors of the D scheduled users (wireless devices). Note that at maximum one data stream (symbol) per user is assumed, thus, D is also the number of simultaneously transmitted data streams. With s being the D-dimensional vector of scheduled symbols and assuming a Zero-Forcing (ZF) transmission scheme, the ZF precoder is computed as $$P_{ZF} = \hat{H}_{\text{eff}}^* (\hat{H}_{\text{eff}} \hat{H}_{\text{eff}}^H)^{-1} \quad (5)$$

The precoded signal computes as $$x = P_{ZF} D s \quad (6)$$

where D is a diagonal matrix with elements chosen for equal power loading.

Next, an implementation (Euclidean distance based CVQ) of the quantizer $Q_c$ is described. Other implementations of quantizer like SINR based CVQ are also applicable.

Remember that one problem of CVQ is the fact that the finally chosen MMSE receive filter (Minimum Mean Square Error receive filter) is not known when the terminal computes the feedback information due to its dependency on the finally chosen precoder and this precoder cannot be computed at the terminals because of the lack of knowledge about the channel state information at other terminals (non-cooperative nature of the downlink channel). To overcome this obstacle, one assumes firstly an arbitrary receive filter. Since the resulting composite channel vector is then an arbitrary linear combination of the rows of $H_k$, it lies in the row space of $H_k$. This fact can be exploited for CVQ in the sense that the codebook entry is chosen such that the distance to the row space of $H_k$ is minimized. However, for computing the CQI, one needs not only the quantized composite channel vector but also an estimate of the receive filter. In the case of Euclidean distance based CVQ, the receive filter is also chosen such that the resulting composite channel vector in the row space of $H_k$ has the minimum Euclidean distance from the quantized channel vector. Note that the optimization criterion of the resulting receive filter is no longer the mean-squared error like in the finally applied MMSE receiver but the Euclidean distance. This leads to a mismatch between true SINR and the one fed back as the CQI and used for scheduling. Finally, the procedure of the Euclidean distance based CVQ method can be summarized as follows:

$$Q_C^{Euclid}: H_k \mapsto (\hat{h}_{eff,k}, \hat{w}_k), \quad (7)$$

$$\hat{h}_{eff,k} = \text{argmax}_{u \in C} \|Q_k^H u\|_2, \; H_k = Q_k R_k \, (\text{QR decomposition})$$

$$\hat{w}_k = \frac{(H_k^H (H_k H_k^H)^{-1})^T Q_k Q_k^H \hat{h}_{eff,k}}{\|(H_k^H (H_k H_k^H)^{-1})^T Q_k Q_k^H \hat{h}_{eff,k}\|_2}$$

In the following, details of zero forcing (ZF) beamforming method are explained using figures. FIG. 8a shows a schematic illustration of a multiuser MIMO (MU-MIMO) system with a base station and two wireless devices (user equipment UE). It illustrates a target configuration for downlink transmission in a multiuser MIMO system. For this, a precoding design and its optimization method for energy savings is desired. In this example, the base station comprises four antennas and each wireless device comprises two antennas. Further, FIG. 8b shows a schematic illustration of the precoding of data. The precoding matrix is used for precoding data for each antenna of the base station and the power amplifiers (PA) of each antenna amplify a corresponding data signal for transmission.

For this, first the base station collects channel state information ($\hat{h}_{1,eff}$ to $\hat{h}_{L,eff}$) from the wireless devices, as it is indicated in FIG. 9, where L is the number of the wireless devices. For precoding with zero forcing (ZF) beamforming method, channel state information $\hat{h}_{1,eff}, \hat{h}_{L,eff}$ is received from the wireless devices at the node. Based on the feedback from the wireless devices (the UE), a composite channel (composite channel matrix) $\hat{H}_{eff}$ may be calculated. The composite channel may indicate the combination of the measured channel $H_k$ at user k and the received filter $w_k$ at user k. Then, the zero forcing ZF precoder $P_{ZF}$ may be calculated.

$$\hat{H}_{eff} = [\hat{h}_{1,eff}, \ldots, \hat{h}_{L,eff}]$$

$$P_{ZF} = \frac{\hat{H}_{eff}^H (\hat{H}_{eff} \hat{H}_{eff}^H)^{-1}}{ZF}$$

The mathematical background for precoding data according to the zero forcing concept is illustrated in FIG. 10. It shows an example for two transmit antennas (TX) and two wireless devices (UE, user equipment). As it can be seen, the transmit power $P_{a1}, P_{a2}$ between the antennas is unequal. The precoded data is then transmitted to the wireless devices. At the wireless devices the receive signals are filtered by a receive filter W to obtain the transmitted data.

However, the ZF precoder (a device which has a precoding function is referred as a precoder) obtained by Equation (5) doesn't possess a constant modulus property. Here, the constant modulus property means pure phase corrections—that is, with no amplitude changes. Therefore, the ZF precoder unequally loads the transmit power for each antenna. Each PA (power amplifier) needs to output higher transmit power than that of a precoder fulfilling the property. As a result, the power consumption of each PA will become higher.

SUMMARY OF THE INVENTION

According to an embodiment, a method is disclosed for determining a precoding matrix for precoding symbols to be transmitted to a plurality of wireless devices by a node of a wireless communication system, wherein the precoding matrix has a precoding vector for each wireless device of the plurality of wireless devices, wherein each precoding vector comprises a precoding element for each transmit antenna of a plurality of transmit antennas of the node, wherein each precoding element represents a phase shifter being able to shift a phase of a symbol to be transmitted through the corresponding transmit antenna to the corresponding wireless device by a phase angle, wherein the method may have the steps of calculating a plurality of interference strength indicators for different phase angles, wherein the different phase angles are applied successively to a precoding element of a precoding vector for the calculation of the interference strength indicators, wherein an interference strength indicator is calculated based on a precoding matrix comprising the precoding element considering the respective different phase angle; and selecting for the precoding element of the precoding vector a phase angle corresponding to a calculated interference strength indicator fulfilling a predefined interference strength criterion.

According to another embodiment, an apparatus is disclosed for determining a precoding matrix for precoding symbols to be transmitted to a plurality of wireless devices by a node of a wireless communication system, wherein the precoded matrix comprises a precoding vector for each wireless device of the plurality of wireless devices, wherein each precoding vector comprises a precoding element for each transmit antenna of a plurality of transmit antennas of the node, wherein each precoding element represents a phase shifter being able to shift a phase of a symbol to be transmitted through the corresponding transmit antenna to the corresponding wireless device by a phase angle, wherein the apparatus may have a processor configured to calculate a plurality of interference strength indicators for different phase angles, wherein the different phase angles are applied successively to a precoding element of a precoding vector, wherein an interference strength indicator is calculated based on a precoding matrix comprising the precoding element considering the respective different phase angle, wherein the processor is configured to select for the precoding element of the precoding vector a phase angle corresponding to a calculated interference strength indicator fulfilling a predefined interference strength criterion.

According to another embodiment, a computer program may have a program code for performing the method for determining a precoding matrix for precoding symbols to be transmitted to a plurality of wireless devices by a node of a wireless communication system, wherein the precoding matrix comprises a precoding vector for each wireless device of the plurality of wireless devices, wherein each precoding vector comprises a precoding element for each transmit antenna of a plurality of transmit antennas of the node, wherein each precoding element represents a phase shifter being able to shift a phase of a symbol to be transmitted through the corresponding transmit antenna to the corresponding wireless device by a phase angle, wherein the method may have the steps of calculating a plurality of interference strength indicators for different phase angles, wherein the different phase angles are applied successively to a precoding element of a precoding vector for the calculation of the interference strength indicators, wherein an interference strength indicator is calculated based on a precoding matrix comprising the precoding element considering the respective different phase angle; and selecting for the precoding element of the precoding vector a phase angle corresponding to a calculated interference strength indicator fulfilling a predefined interference strength criterion, wherein the computer program runs on a computer or a microcontroller.

An embodiment of the invention provides a method for determining a precoding matrix for precoding symbols to be transmitted to a plurality of wireless devices by a node of a wireless communication system. The precoding matrix comprises a precoding vector for each wireless device of the plurality of wireless devices and each precoding vector comprises a precoding element for each transmit antenna of a plurality of transmit antennas of the node. Each precoding element represents a phase shifter being able to shift a phase of a symbol to be transmitted through the corresponding transmit antenna to the corresponding wireless device by a phase angle. The method comprises calculating a plurality of interference strength indicators for different phase angles. The different phase angles are applied successively to a precoding element of a precoding vector for the calculation of the interference strength indicators. An interference strength indicator is calculated based on a precoding matrix comprising the precoding element considering the respective different phase angles. Further, the method comprises selecting for the precoding element of the precoding vector a phase angle corresponding to a calculated interference strength indicator fulfilling a predefined interference strength criterion.

Embodiments according to the present invention are based on the central idea that a precoding matrix comprising a constant modulus property realized by precoding elements being phase shifter while the phase angles for the phase shifters are determined by considering an interference strength between wireless devices caused by a simultaneous transmission of data to the wireless devices. In this way, the power consumption for transmitting data to the plurality of wireless devices by the node can be significantly reduced, since the different power amplifiers of the different antennas of the transmitter of the node comprise equal transmitted power and power consumption, while the sum rate is high due to low interference strength.

In some embodiments according to the invention all precoding elements of the precoding matrix represent a phase shifter being able to shift the phase of a symbol to be transmitted without changing an amplitude of the symbol. Therefore, the power consumption for a transmission of data through each transmit antenna of the plurality of transmit antennas of the node may be equal.

Some embodiments according to the invention comprise precoding the symbols to be transmitted to the plurality of wireless devices with the precoding matrix using the selected phase angle for the precoding element of the precoding vector. The precoded symbols can then be transmitted through the plurality of transmit antennas.

BRIEF DESCRIPTION OF THE DRAWINGS

Embodiments of the present invention will be detailed subsequently referring to the appended drawings, in which:

FIG. 5A, 5B are a schematic illustrations comparing the mathematical background of a proposed method and the known zero forcing method;

DETAILED DESCRIPTION OF THE PREFERRED EMBODIMENTS

Figure 1:
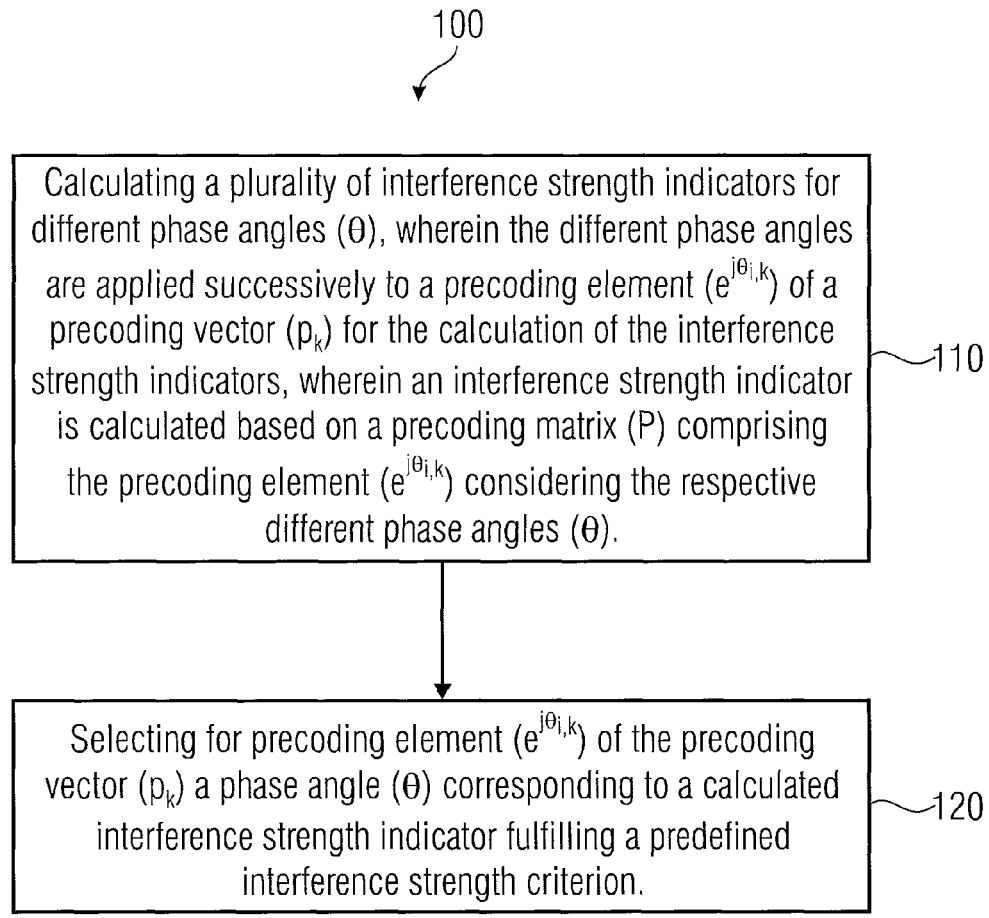
FIG. 1 is a flowchart of a method for determining a precoding matrix for precoding symbols to be transmitted to a plurality of wireless devices.

In the following, the same reference numerals are partly used for objects and functional units having the same or similar functional properties and the description thereof with regard to a figure shall apply also to other figures in order to reduce redundancy in the description of the embodiments.

FIG. 1 shows a flowchart of a method 100 for determining a precoding matrix $P_{CM}$ (optimized precoding matrix) for precoding symbols s to be transmitted to a plurality of wireless devices by a node of a wireless communication system according to an embodiment of the invention. The precoding matrix $P_{CM}$, P comprises a precoding vector $p_k$ for each wireless device of the plurality of wireless devices and each precoding vector $p_k$ comprises a precoding element $e^{j\theta_{i,k}}$ for each transmit antenna of the plurality of transmit antennas of the node. Further, each precoding element $e^{j\theta_{i,k}}$ represents a phase shifter being able to shift a phase of a symbol s to be transmitted through the corresponding transmit antenna to the corresponding wireless device by a phase angle. The method 100 comprises calculating 110 a plurality of interference strength indicators for different phase angles θ. The different phase angles are applied successively to a precoding element $e^{j\theta_{i,k}}$ of a precoding vector $p_k$ for the calculation of the interference strength indicators. An interference strength indicator is calculated based on a precoding matrix P comprising the precoding element $e^{j\theta_{i,k}}$ considering the respective different phase angles θ. Further, the method 100 comprises selecting 120 a phase angle θ corresponding to a calculated interferences strength indicator fulfilling a predefined interference strength criterion for the precoding element $e^{j\theta_{i,k}}$ of the precoding vector $p_k$ to obtain the precoding matrix $P_{CM}$ (optimized precoding matrix) for precoding symbols s to be transmitted to a plurality of wireless devices.

An interference strength indicator represents an interference strength between wireless devices caused by simultaneous transmission of data to the wireless devices by a node, if one of the different phase angles θ is applied to the precoding element $e^{j\theta_{i,k}}$.

An interference strength indicator may be defined in many different ways. The actual definition of the interference strength indicator may influence the maximal achievable data rate and the needed computational effort. For example, a more accurate representation of the physical background of the interference between the wireless devices may result in a higher computational effort and vice versa.

The predefined interference strength criterion may also be defined in various ways. For example, the predefined interference strength criterion could be selecting a phase angle corresponding to a calculated interference strength indicator indicating one of the lowest interference strengths (e.g. one of the five lowest interference strengths). Advantageously, a phase angle is selected corresponding to the calculated interference strength indicator indicating the lowest interference strength of the plurality of calculated interference strength indicators. Alternatively, a phase angle corresponding to an interference strength indicator indicating an interference strength lower than an interference threshold may be selected. Through the setting of the interference threshold, the runtime of the calculation of the precoding matrix and/or the achievable maximal transmission rate may be adjustable. In other words, the predefined interference strength criterion may be fulfilled for a calculated interference strength indicator indicating the lowest interference strength of the plurality of calculated interference strength indicators or the predefined interference strength criterion may be fulfilled for a calculated interference strength indicator indicating an interference strength lower than an interference threshold, for example.

A node of a wireless communication system may be a base station or a relay node, for example. Further, a wireless device may be a mobile phone or a laptop needing a wireless data transmission, for example.

Optionally, the method 100 may further comprise precoding the symbols s to be transmitted to the plurality of wireless devices with the precoding matrix $P_{CM}$ applying the selected phase angle θ applied to the precoding element $e^{j\Theta_{i,k}}$ of the precoding vector $p_k$. Further, the precoded symbols may be transmitted to the plurality of wireless devices.

In some embodiments of the invention, all precoding elements $e^{j\Theta_{i,k}}$ of the precoding matrix $P_{CM}$ represent a phase shifter being able to shift the phase of a symbol s to be transmitted without changing an amplitude of the symbol s (of a signal containing symbol s). In other words, only the phase of the symbol may be varied to generate the signals for a transmission through the different antennas of the node while the amplitude may be the same for all antennas. Alternatively, the amplitude of the symbol may be changed, but the amplification factor for each transmit antenna of the plurality of transmit antennas is equal. In this way, the transmitted power of each transmit antenna of the plurality of transmit antennas of the node is equal (e.g. with a tolerance of +/−1%, +/−5%, +/−10% of the transmitted power of a transmit antenna), so that the overall power consumption of the node can be reduced in comparison to known concepts.

If all precoding elements $e^{j\Theta_{i,k}}$ represent a phase shifter, interference strength indicators may be calculated for each precoding element $e^{j\Theta_{i,k}}$ and for each precoding element $e^{j\Theta_{i,k}}$ a phase angle may be selected. In other words, an interference strength indicator may be calculated for different phase angles θ applied to each precoding element $e^{j\Theta_{i,k}}$ of each precoding vector $p_k$ of the precoding matrix $P_{CM}$. Further, a phase angle θ may be selected for each precoding element $e^{j\Theta_{i,k}}$ of each precoding vector $p_k$ corresponding to the calculated interference strength indicator indicating the lowest interference strength of all calculated interference strength indicators.

These interference strength indicators may be calculated iteratively by applying different sets of phase angles to the different precoding elements $e^{j\Theta_{i,k}}$. This may be realized by a plurality of loops, each loop varying a phase angle of a specific precoding element $e^{j\Theta_{i,k}}$.

The different phase angles may be chosen arbitrarily between 0 and 2π. For example, phase angles may be selected randomly between 0 and 2π to be applied to a precoding element $e^{j\Theta_{i,k}}$ or may be selected from a predefined set of phase angles Θ. The predefined set of phase angles Θ may comprise an equidistant distribution (or another deterministic distribution) or a random distribution of phase angles θ from 0 to 2π. In other words, the different phase angles θ being applied to a precoding element $e^{j\Theta_{i,k}}$ may be contained by a predefined set of phase angles Θ comprising an equidistant distribution of phase angles θ from 0 to 2π.

As mentioned before, an interference strength indicator can be defined in various different ways. For example, an interference strength indicator may be calculated based on a multiplication of a channel matrix $\hat{H}_{eff}$ and the precoding matrix P. The channel matrix $\hat{H}_{eff}$ may be based on a channel state information received from the plurality of wireless devices. The channel matrix may characterize the channels between the node and the plurality of wireless devices.

In a more detailed example, an interference strength indicator may be calculated based on a difference between an interference suppression matrix and a result of the multiplication of the channel matrix $\hat{H}_{eff}$ and the precoding matrix P. In this example, the interference suppression matrix may be an identify matrix I, a weighted (scaled) identity matrix aI (e.g. interference strength indicators are calculated for different weighting values a for the weighted identify matrix aI) or the interference suppression matrix may be a diagonal matrix (e.g. interference strength indicators may be calculated for the different sets of diagonal elements d of the diagonal matrix D).

For the scheduling of wireless devices, the proposed method may be combined with the zero forcing method to reduce the computational complexity.

In the following, some embodiments of the invention are described in more detail. The described features may be used together or may be used independent from each other in combination with the basic concept described above. Some of the explanations below relate to a node with two transmit antennas serving two wireless antennas, however the applicability of the proposed concept is not limited to such a system and can also be applied to an arbitrary number of transmit antennas of a node and an arbitrary number of wireless devices.

As mentioned above, the conventional method obtains the precoding matrix by the ZF method. However, this precoder doesn't necessarily satisfy the constant modulus property, which means pure phase corrections—that is, with no amplitude changes, for example. Therefore, the ZF precoder unequally loads the transmit power for each antenna. This causes some problems at the PAs (power amplifiers) connected to the antenna. Each PA needs to output higher transmit power than that of a precoder fulfilling the property. As a result, the power consumption of each PA will become higher. The proposed method addresses the problems discussed above, and aims to ensure that PAs connected to each antenna is loaded equally by realizing the constant modulus property. For this a precoder with constant modulus property may be defined. Then, we explain an optimization method for the precoder to minimize the inter-user interference (IUI) is explained providing a precoder based on constant modulus.

The precoder may be defined as follows:

$$P=[p_1, p_2, \ldots, p_D] \quad (8)$$

where $$p_k=[e^{j\Theta_{1,k}}, e^{j\Theta_{2,k}}, \ldots, e^{j\Theta_{M,k}}]^T, k \in \{1, \ldots D\} \quad (9)$$

Each column vector corresponds to the precoder of the selected user (wireless device) if assuming one data stream per user. Since each element (precoding element) of the vector (precoding vector) is a phase shifter, the proposed precoder has a constant modulus property. That is, the precoder corrects only phase with no amplitude changes. Next, an optimization function and an example of an algorithm is described, and we show how to select the best set of $\theta_{i,k}, i \in \{1, \ldots, M\}, k \in \{1, \ldots D\}$ to minimize the IUI (inter user interference). In other words, the proposed precoding matrix may comprise only phase correction. In this way, the constant modulus property may be satisfied.

$$P = [p_1, p_2] = \begin{bmatrix} e^{j\theta_{1,1}} & e^{j\theta_{1,2}} \\ e^{j\theta_{2,1}} & e^{j\theta_{2,2}} \end{bmatrix}$$

$$|e^{j\theta_{i,k}}| = 1$$

In the following an example for selecting the optimum set of $\theta_{i,k}$ is explained. If the following equation is satisfied, the IUI can be suppressed:

$$\hat{H}_{eff} P = I \quad (10)$$

where I is the D×D identity matrix (D is the number of wireless devices). In other words, if this can be achieve, each UE's precoding vector will become orthogonal to the other UEs' channel and suppress IUI. Due to the constant modulus property, it is impossible to satisfy the above Equation (10). Therefore, at least, $\hat{H}_{eff} P$ need to be as close to the identity matrix as adjusting the elements of P. The obtained matrix would not completely suppress the IUI because it doesn't satisfy Equation (10). However, please note that the precoder is calculated using the effective channel matrix estimate $\hat{H}_{eff}$. The matrix $\hat{H}_{eff}$ includes a quantization error compared to the real channel. Thus, some amount of IUI would remain even if Equation (10) is realized. On the other hand, the ZF precoder is also obtained by $\hat{H}_{eff}$ and some IUI would remain as well. Therefore, the deterioration caused by the proposed method would be neglected.

In order to make $\hat{H}_{eff} P$ close to the identity matrix, a target equation can be described as follows:

$$P_{CM} = \underset{P \in \Pi}{\operatorname{argmin}} \|\hat{H}_{eff} P - I\|_F^2; \quad (11)$$

$$\Pi = \{P \in \mathbb{C}^{M \times D} \mid [P]_{i,k} = e^{j\theta_{i,k}}; \theta_{i,k} \in [0, 2\pi[\}$$

In Equation (11), I can be replaced by the scaled identity matrix or a diagonal matrix. We can describe these formulas as follows:

$$(P_{CM}, a_{CM}) = \underset{P \in \Pi, a \in \mathbb{R}_+}{\operatorname{argmin}} \|\hat{H}_{eff} P - aI\|_F^2; \quad (12)$$

$$\Pi = \{P \in \mathbb{C}^{M \times D} \mid [P]_{i,k} = e^{j\theta_{i,k}}; \theta_{i,k} \in [0, 2\pi[\},$$

$$(P_{CM}, D_{CM}) = \underset{\substack{P \in \Pi, \\ D = \operatorname{diag}(d_1, \ldots, d_D)}}{\operatorname{argmin}} \|\hat{H}_{eff} P - D\|_F^2; \quad (13)$$

$$\Pi = \{P \in \mathbb{C}^{M \times D} \mid [P]_{i,k} = e^{j\theta_{i,k}}; \theta_{i,k} \in [0, 2\pi[\},$$

In this connection, $P_{CM}$ is the precoding matrix to be determined, $\hat{H}_{eff}$ is a channel matrix based on a channel state information received from the plurality of wireless devices, P is a precoding matrix considering a specific phase angle of the different phase angles for a precoding element, I is an identity matrix, $\Pi$ is a set of precoding matrices considering different phase angles, $\alpha$ is a weighting factor, D is a diagonal matrix with elements $d_1$-$d_D$, $e^{j\theta_{i,k}}$ is a precoding element, $\theta_{i,k}$ is a phase angle, $\alpha_{CM}$ is a weighting factor corresponding to an interference strength indicator indicating the lowest interference strength, $D_{CM}$ is a diagonal matrix corresponding to an interference strength indicator indicating the lowest interference strength and $\|\hat{H}_{eff} P - D\|_F^2$ is an interference strength indicator.

However, the scalar variable $\alpha$ or the diagonal values in D have to be optimized in Equation (12) or (13), respectively. These equations can be used if a higher performance than Equation (11) is needed. Next, an example of an algorithm for only Equation (11) is explained, but similar techniques will be used for the other two equations. For simplicity, the case of D=2 and M=2 is explained. The precoder can be written as $$P_{CM} = [p_1, p_2] = \begin{bmatrix} e^{j\theta_{1,1}} & e^{j\theta_{1,2}} \\ e^{j\theta_{2,1}} & e^{j\theta_{2,2}} \end{bmatrix} \quad (14)$$

First, the finite number of set $$\theta \in \left\{ m \frac{2\pi}{N} \,\bigg|\, m \in \{0, 1, \ldots, N-1\} \right\}$$

is defined. The algorithm is based on the idea to find the optimum phase tuple $\theta_{opt} \in [0, 2\pi[^4$ (phase angles) to minimize $\|\hat{H}_{eff} P - I\|_F^2$ (interference strength indicator) calculating all possible combinations as shown in Algorithm 1 below. Finally, $P_{CM}$ can be obtained from $\theta_{opt}$.

---

Algorithm 1:

Temp Value is initialized (relatively high value).
for $\theta_{1,1} \in \Theta$ do
  for $\theta_{2,1} \in \Theta$ do
    for $\theta_{1,2} \in \Theta$ do
      for $\theta_{2,2} \in \Theta$ do
        compute TempValue = $\|\hat{H}_{eff} P - I\|_F^2$
        if TempValue is smaller than the previous TempValue then
          $\theta_{opt} \leftarrow [\theta_{1,1}, \theta_{2,1}, \theta_{1,2}, \theta_{2,2}]^T$
        end
      end
    end
  end
end

---

Figure 3:
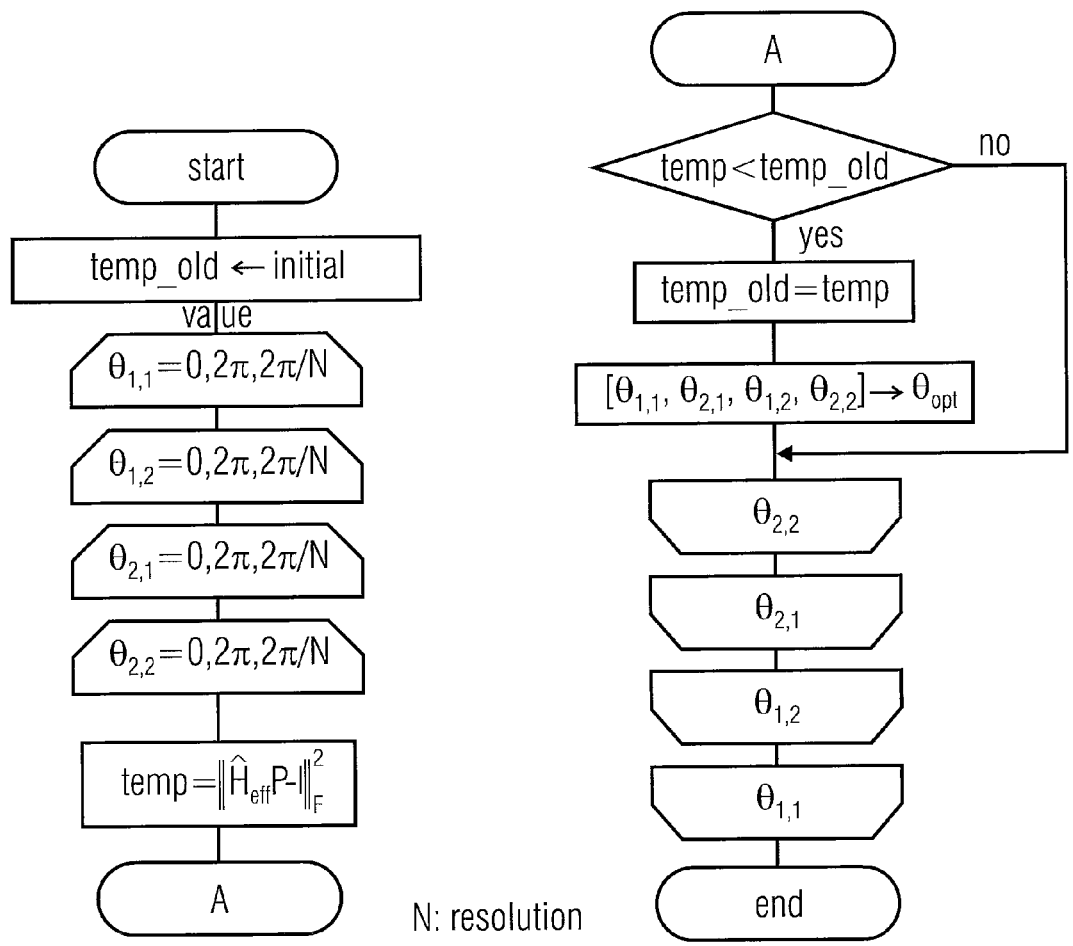
FIG. 3 is a flowchart of a method for determining a precoding matrix for precoding symbols to be transmitted to a plurality of wireless devices.

FIG. 3 is a flowchart of a method for determining a precoding matrix for precoding symbols to be transmitted to a plurality of wireless devices according to an embodiment of the invention. It illustrates an example for a node with two transmit antennas and two wireless devices as it is also described by algorithm 1 above. First, an initial interference strength indicator is set by an initial value (temp_old). The initial value may be chosen relatively high, which means a value higher than an estimated highest interference strength indicator or an estimated average interference strength indicator. Then, interference strength indicators temp (or tempvalue) are calculated for different phase angles $\theta_{1,1}$, $\theta_{1,2}$, $\theta_{2,1}$ and $\theta_{2,2}$ (0, $2\pi$ and $2\pi/N$, wherein N is the resolution). Further, a set of optimal phase angles $\theta_{opt}$ is updated with the currently applied set of phase angles, if the new interference strength indicator temp is smaller than the old interference strength indicator temp_old and the old interference strength indicator temp_old is set equal to the new interference strength indicator temp. After the computation of interference strength indicators for all permutations of different phase angles for the different precoding elements, a set $\theta_{opt}$ of precoding vectors $\theta_{1,1}$, $\theta_{1,2}$, $\theta_{2,1}$ and $\theta_{2,2}$ corresponding to the lowest calculated interference strength indicator is obtained. This set of phase angles can be used for the precoding matrix to be applied for precoding symbols to be transmitted to the plurality of wireless devices.

Next, an example for a scheduling method for the proposed method is explained. A conventional method can be applied for the scheduler. As the general scheduling method, firstly the scheduler utilizes the feedback information and preselects users that have the best rate or have the best metric according to, e.g., Proportional Fairness (PF) scheduling. After that, the best combination for multi-user MIMO from these preselected users is found out taking the IUI into account. In order to obtain the amount of the IUI, for example, the precoder is calculated using the above exhaustive algorithm for the selected users and then the IUI are calculated. However, this procedure will increase the computational complexity because the exhaustive search is done for all combinations. In order to reduce the computational complexity, combining the ZF method and the proposed method could be useful. The best combination of users for multi-user MIMO is selected by the conventional ZF method. After that, the precoder matrix for the selected users is calculated by the proposed method. In other word, the proposed method may be used only once at the last phase. If this technique is used, the conventional method can be reused effectively and also the computational complexity can be reduced.

Figure 6:
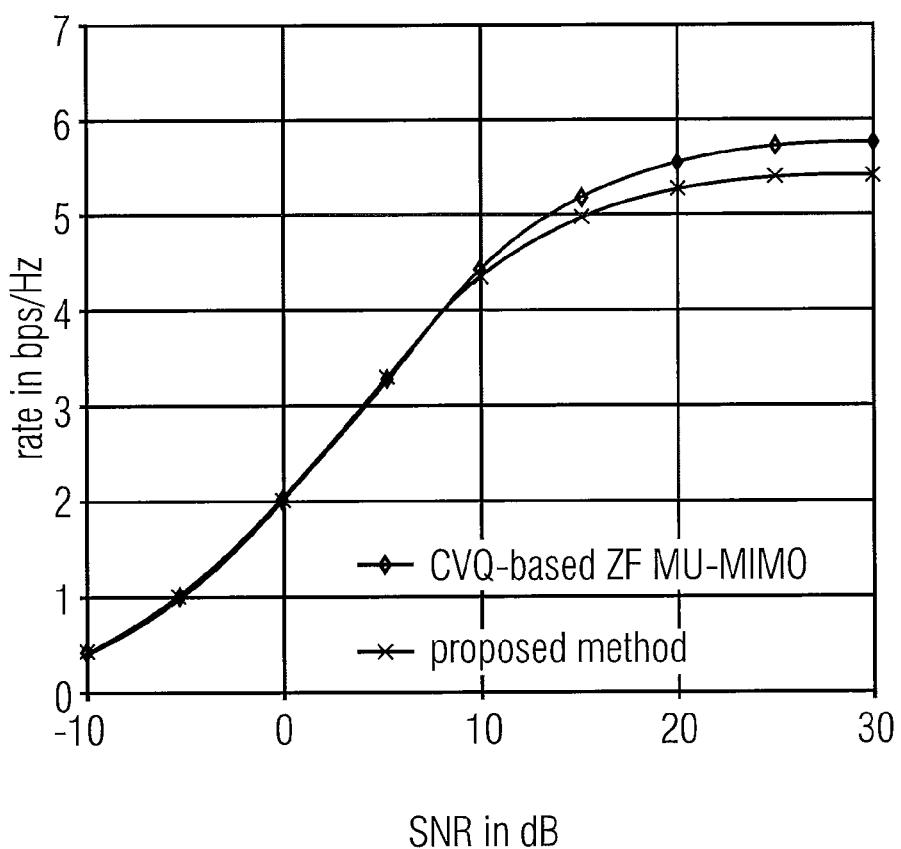
FIG. 6 is a diagram indicating a comparison of the performance of the proposed method and a known channel vector quantization based zero forcing multiuser multiple-input multiple-output method.

In the following, capacity-level simulation results with the proposed method are presented. The parameters used for the simulation are shown in Table 1. FIG. 6 shows the performance difference between the conventional CVQ-based ZF method and the proposed method. The performance of the proposed method is close to the CVQ-based ZF method. The proposed method cannot attain Equation (10) and therefore some amount of IUI cannot be removed completely. On the other hand, the ZF precoding can achieve $\hat{H}_{eff} P_{ZF} = I$. However, the effective channel matrix estimate $\hat{H}_{eff}$ includes the quantization error compared to the real channel. Thus, some amount of IUI would remain due to this error as well. Therefore, the difference between proposed method and the conventional ZF becomes small.

TABLE 1

Simulation Parameters

| | |
|---|---|
| Number of TX antennas | 4 |
| Number of RX antennas | 1 |
| Number of users | 20 |
| Number of feedback bits | 4bit |
| Channel correlation | uncorrelated |

In other words, FIG. 6 shows a capacity level simulation for a channel vector quantization based zero forcing multiuser multiple-input multiple-output system (CVQ-based ZF MU-MIMO) in comparison to the proposed method. The performance is equivalent to the zero forcing multiuser multiple-input multiple-output system, while savings in the total consumption of power can be obtained by a factor of up to four. In this example, a node with four transmit antennas TX and 20 wireless devices (users) with one receive antenna RX each is simulated. Further, a feedback of 4 bits and a resolution N of 32 is used with uncorrelated channels.

The diagram indicates the signal to noise ratio SNR in dB versus the rate in bps/Hz.

Some embodiments of the invention relate to a zero forcing like multiuser MIMO (multiple-input multiple-output) precoding based on the constant modulus property. A new MU-MIMO precoding method for wireless cellular networks aiming at reduction of power consumption of power amplifiers (PAs) is proposed. The present invention allows a precoder to have the constant modulus property while trying to mitigate multiuser interference as much as possible, for example. The property achieves pure phase corrections with no amplitude changes. A conventional method such as Zero Forcing (ZF) method doesn't ensure the PAs connected to each antenna is loaded equally due to lack of this property. Therefore, each PA needs to output higher transmit power than that of a precoder fulfilling the property. As a result, the power consumption of each PA will become higher.

The present invention addresses the problems discussed above, and aims to ensure that PAs connected to each antenna is loaded equally by realizing the constant modulus property, for example.

The present invention enables PAs connected to each antenna loaded equally on multiuser MIMO communications, which allows the whole PAs connected to each antenna to operate at the high power efficiency region. Consequently, it can reduce the power consumption at eNBs and reduce OPEX (operational expenses) eventually. Therefore it contributes to provide green technologies for the future commercial system. It was shown, that the proposed method offers similar performance in terms of the capacity than the conventional CVQ-based ZF MU-MIMO technique.

Figure 2:
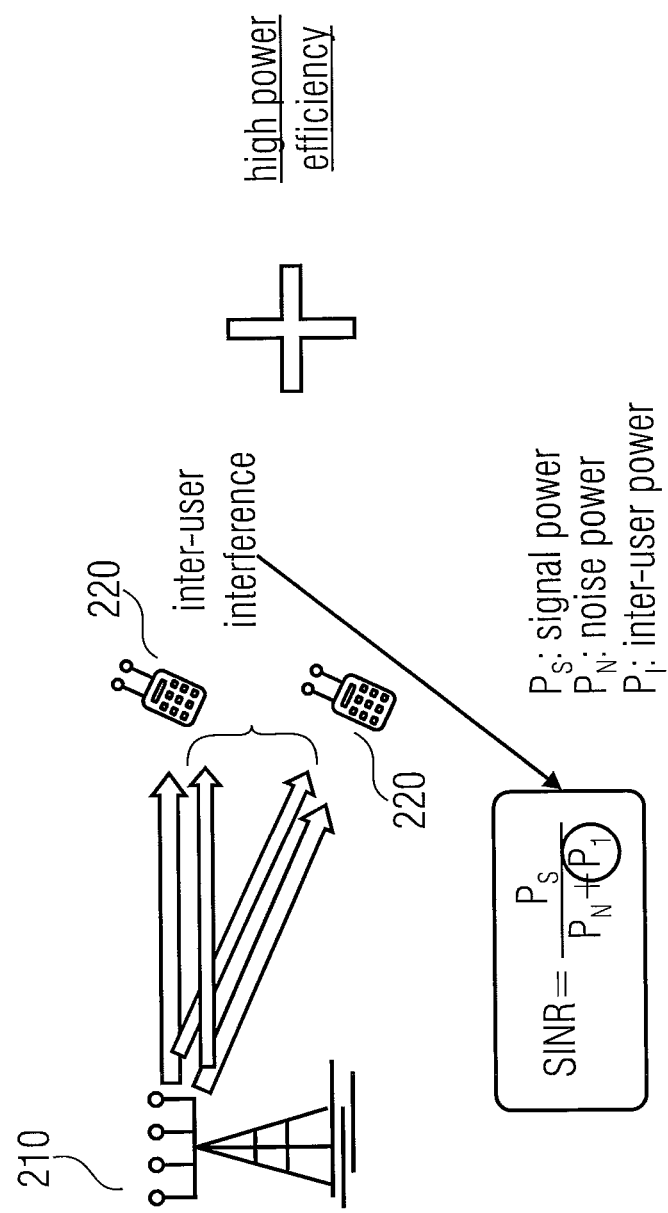
FIG. 2 is a schematic illustration of a transmission of data to wireless devices.

FIG. 2 illustrates an example for a transmission from a node 210 (e.g. base station) to wireless devices 220 indicating the data to be transmitted and an inter-user interference SINR with $P_S$ indicating a signal power, $P_N$ indicating a noise power and $P_I$ indicating an inter-user power. For low inter-user interference, zero forcing beamforming is mainly used by known concepts. The proposed concept may enable a low inter-user interference and a high power efficiency.

Figure 4A:
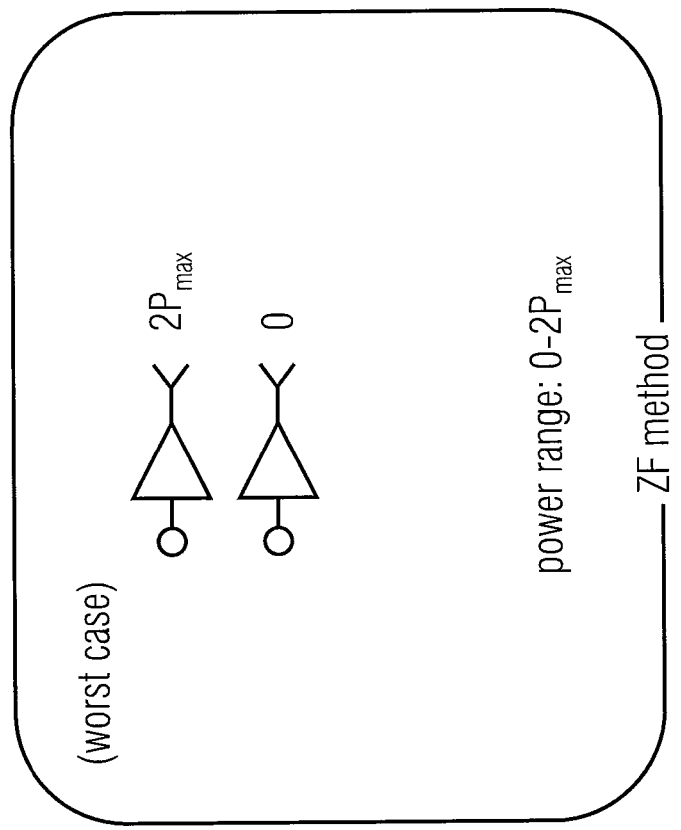
FIGS. 4A, 4B illustrate a schematic comparison of a proposed method with the known zero forcing method.
Figure 4B:
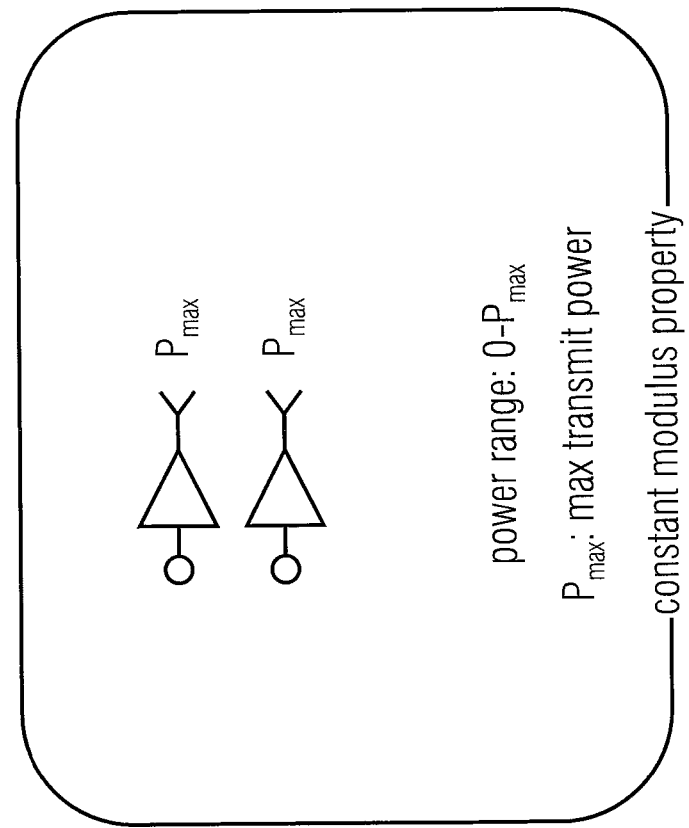

FIGS. 4a and 4b show a comparison of the zero forcing method and a constant modulus property method representing the proposed concept. The zero forcing precoding unequally loads the transmit power P at each power amplifier, so that the power range reaches from 0 to $2P_{max}$, wherein $P_{max}$ indicates the maximal transmit power of the constant modulus property method, which comprises a power range from 0 to $P_{max}$. This shows that the zero force ZF method may need twice as much output power. In other words, the power consumption (of the ZF method) may be doubled at each power amplifier (compared to the proposed concept).

FIGS. 5a and 5b compare the optimization method for the proposed precoder (FIG. 5b proposed method) with the zero forcing method (ZF in FIG. 5a). In the case of the zero forcing method, the product of the precoding matrix $P_{ZF}$ and the channel matrix $\hat{H}_{eff}$ is the identify matrix I. In comparison, the proposed method tries to optimize the product of the precoding matrix $P_{CM}$ and the channel matrix $\hat{H}_{eff}$ to become as close as possible to the identity matrix, for example. For example, an interference strength indicator may be defined by $$\hat{H}_{eff}P - I = \begin{bmatrix} \hat{h}_{1,1} & \hat{h}_{1,2} \\ \hat{h}_{2,1} & \hat{h}_{2,2} \end{bmatrix} \begin{bmatrix} e^{j\theta_{1,1}} & e^{j\theta_{1,2}} \\ e^{j\theta_{2,1}} & e^{j\theta_{2,2}} \end{bmatrix} - \begin{bmatrix} 1 & 0 \\ 0 & 1 \end{bmatrix}$$

$$= \begin{bmatrix} \hat{h}_{1,1}e^{j\theta_{1,1}} + \hat{h}_{1,2}e^{j\theta_{2,1}} - 1 & \hat{h}_{1,1}e^{j\theta_{2,1}} + \hat{h}_{1,2}e^{j\theta_{2,2}} \\ \hat{h}_{2,1}e^{j\theta_{1,1}} + \hat{h}_{2,2}e^{j\theta_{2,1}} & \hat{h}_{2,1}e^{j\theta_{1,2}} + \hat{h}_{2,2}e^{j\theta_{2,2}} - 1 \end{bmatrix}$$

or $$\|\hat{H}_{eff}P - I\|_F^2 = |\hat{h}_{1,1}e^{j\theta_{1,1}} + \hat{h}_{1,2}e^{j\theta_{2,1}} - 1|^2 + |\hat{h}_{1,1}e^{j\theta_{2,1}} + \hat{h}_{1,2}e^{j\theta_{2,2}}|^2 + |\hat{h}_{2,1}e^{j\theta_{1,1}} + \hat{h}_{2,2}e^{j\theta_{2,1}}|^2 + |\hat{h}_{2,1}e^{j\theta_{1,2}} + \hat{h}_{2,2}e^{j\theta_{2,2}} - 1|^2$$

This illustrates an example of a node with two transmit antennas and two wireless devices. In this example, the interference strength indicators are functions of $\theta_{1,1}, \theta_{1,2}, \theta_{2,1}$ and $\theta_{2,2}$ representing phase angles of different precoding elements $e^{j\Theta_{i,k}}$.

Then, the precoding matrix $P_{CM}$ may be obtained by selecting phase angles $\theta_{i,k}$:

$$P_{CM} = \underset{P \in \Pi}{\operatorname{argmin}} \|\hat{H}_{eff}P - I\|_F^2; \Pi = \{P \in \mathbb{C}^{M \times D} \mid [P]_{i,k} = e^{j\theta_{i,k}}; \theta_{i,k} \in [0, 2\pi[\}$$

With the proposed concept, the power consumption at eNBs (evolved node B) and OPEX (operation expenses) can be reduced. Further, the proposed method may contribute to provide green technology for the future commercial systems and revenues can be gained.

Figure 7:
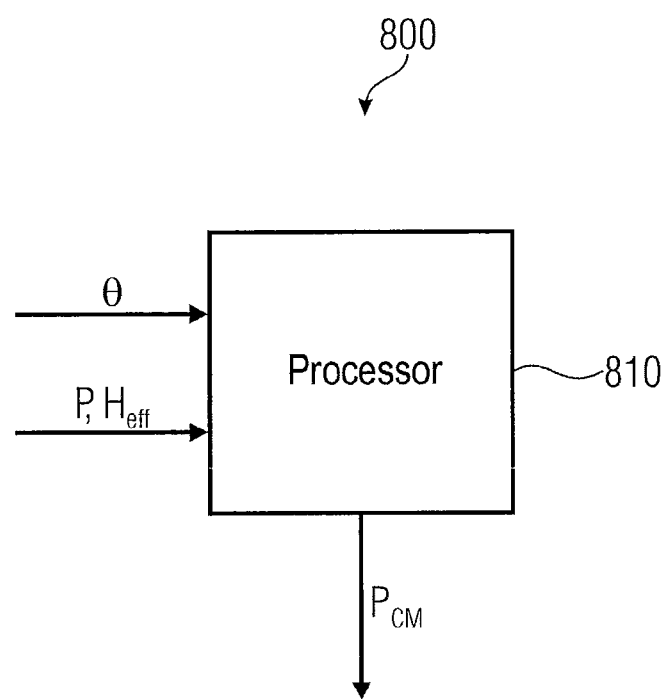
FIG. 7 is a block diagram of an apparatus for determining a precoding matrix for precoding symbols to be transmitted to a plurality of wireless devices.
Figure 8B:
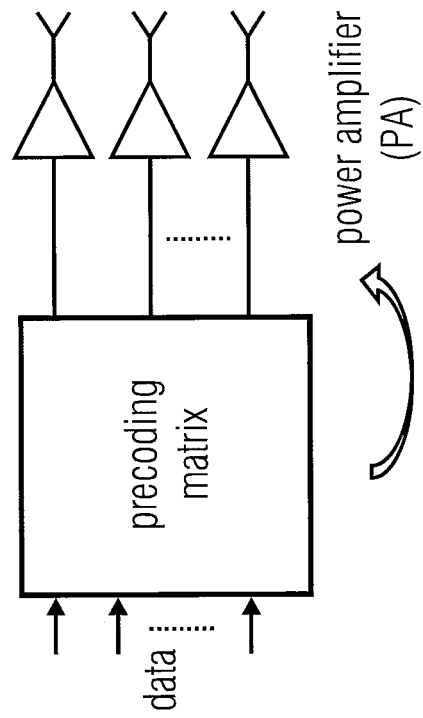
FIG. 8B is a schematic illustration of the precoding of data.
Figure 8A:
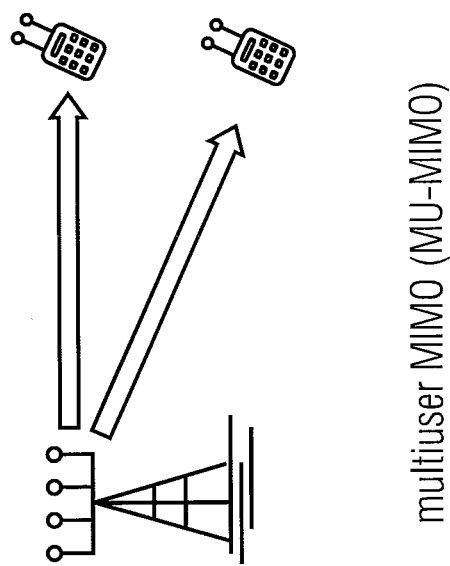
FIG. 8A is a schematic illustration of a multiuser multiple-input multiple-output system.
Figure 9:
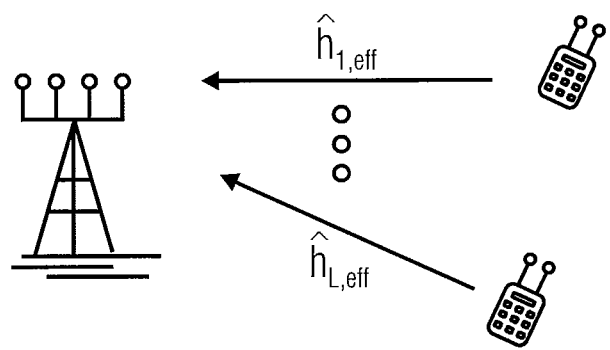
FIG. 9 is a schematic illustration of the reception of channel state information.
Figure 10:
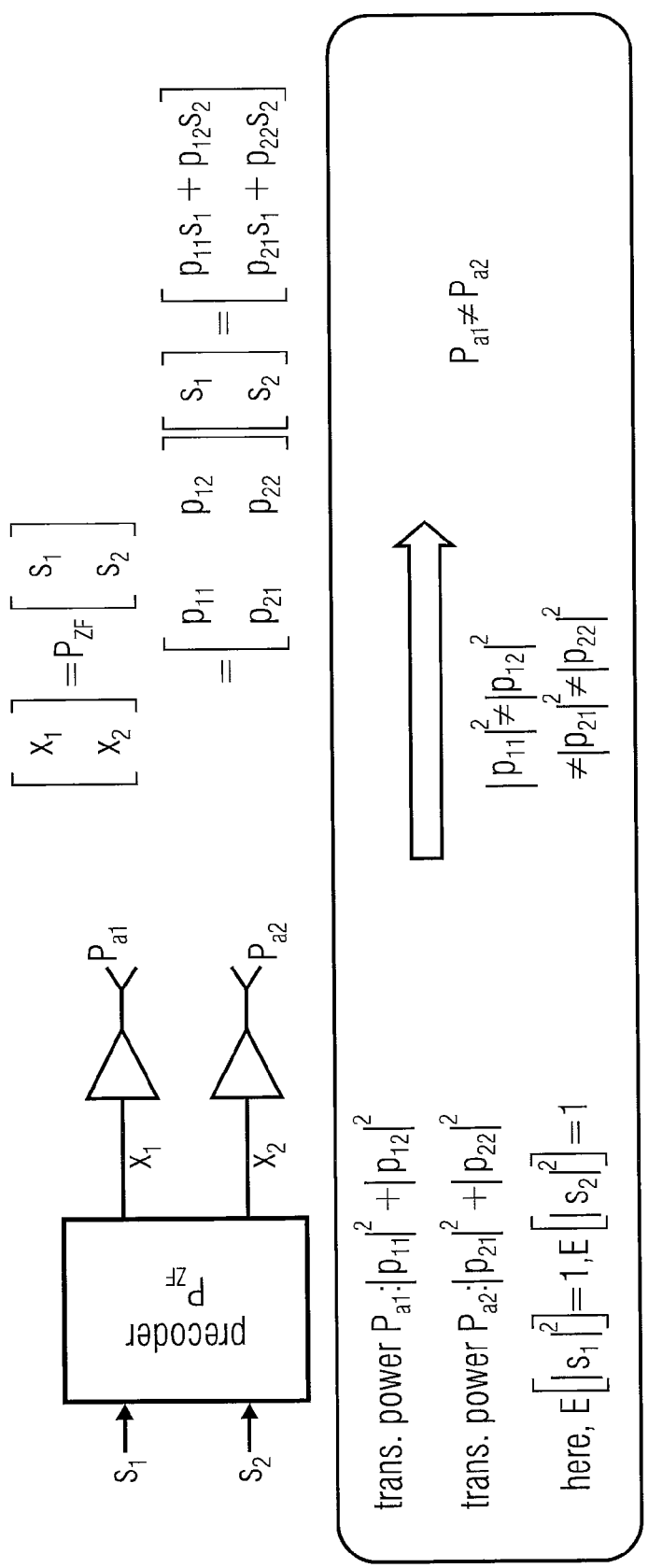
FIG. 10 is an illustration of the mathematical background of the known zero forcing method.

FIG. 7 shows a block diagram of an apparatus 800 for determining a precoding matrix $P_{CM}$ for precoding symbols s to be transmitted to a plurality of wireless devices by a node of a wireless communication system according to an embodiment of the invention. The precoding matrix $P_{CM}$ comprises a precoding vector $p_k$ for each wireless device of the plurality of wireless devices and each precoding vector $p_k$ comprises a precoding element $e^{j\Theta_{i,k}}$ for each transmit antenna of a plurality of transmit antennas of the node. Each precoding element $e^{j\Theta_{i,k}}$ represents a phase shifter being able to shift a phase of a symbol s to be transmitted through the corresponding transmit antenna to the corresponding wireless device by a phase angle $\theta$. The apparatus 800 comprises a processor 810 configured to calculate a plurality of interference strength indicators for different phase angles $\theta$. The different phase angles are applied successively to a precoding element $e^{j\Theta_{i,k}}$ of a precoding vector $p_k$. An interference strength indicator is calculated based on the precoding matrix P comprising the precoding element $e^{j\Theta_{i,k}}$ considering the respective different phase angles $\theta$. Further, the processor 810 selects for the precoding element $e^{j\Theta_{i,k}}$ of the precoding vector $p_k$ a phase angle $\theta$ corresponding to a calculated interference strength indicator fulfilling a predefined interference strength criterion.

The apparatus 800 or the processor 810 of the apparatus 810 may comprise one or more additional features or units realizing one or more aspects of the concept described above.

For example, the apparatus 800 may further comprise a precoder for precoding symbols to be transmitted to the wireless devices. Further, the apparatus 800 may comprise a transmitter for transmitting the precoded symbols to the wireless device.

The processor 810, the precoder, the transmitter and/or other optional units of the apparatus 800 may be independent hardware units or part of a computer, a microcontroller or a digital signal processor as well as a computer program or a software product for running on a computer, a microcontroller or a digital signal processor.

Some embodiments of the invention relate to a base station of a wireless communication system comprising an apparatus for determining a precoding matrix for precoding symbols to be transmitted to a plurality of wireless devices according to the described concept.

Some embodiments of the invention relate to a method for precoding input symbols with a precoding matrix comprising adjusting phase of said input symbols in a multiuser MIMO system. The method comprises the steps of setting initial phase on said precoding matrix and calculating a value of an evaluating function (interference strength indicator) using said precoding matrix and a channel matrix consistent (containing) of feedback (or parameters obtained from the feedback) of selected UEs (wireless devices, user equipment). Further, the method comprises comparing the value and a reference value, adjusting the phase of said precoding matrix so that said value becomes smaller than the reference value and precoding the input symbols with the resulting precoding matrix.

In some examples, said evaluating function is to compare a product of said channel matrix and the precoding matrix with the reference matrix (interference suppression matrix). The said reference matrix may be a positive definite diagonal matrix, a scaled (weighted), or unsealed identity matrix.

In some embodiments, said reference value is changed to a smallest value of the evaluating function for each round of repetition. The said reference value may be a predetermined value.

According to an aspect, said phases are selected from a predefined finite number of phase sets.

In some examples, said UEs (wireless devices) are selected so as to maximize sum rate.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. Method for determining a precoding matrix for precoding symbols to be transmitted to a plurality of wireless devices by a node of a wireless communication system, wherein the precoding matrix comprises a precoding vector for each wireless device of the plurality of wireless devices, wherein each precoding vector comprises a precoding element for each transmit antenna of a plurality of transmit antennas of the node, wherein each precoding element represents a phase shifter being able to shift a phase of a symbol to be transmitted through the corresponding transmit antenna to the corresponding wireless device by a phase angle, the method comprising:

calculating a plurality of interference strength indicators for different phase angles, wherein the different phase angles are applied successively to a precoding element of a precoding vector for the calculation of the interference strength indicators, wherein an interference strength indicator is calculated based on a precoding matrix comprising the precoding element considering the respective different phase angle; and selecting for the precoding element of the precoding vector a phase angle corresponding to a calculated interference strength indicator fulfilling a predefined interference strength criterion.

2. Method according to claim 1, wherein the predefined interference strength criterion is fulfilled for a calculated interference strength indicator indicating the lowest interference strength of the plurality of calculated interference strength indicators or the predefined interference strength criterion is fulfilled for a calculated interference strength indicator indicating an interference strength lower than an interference threshold.

3. Method according to claim 1, wherein an interference strength indicator represents an interference strength between wireless devices caused by a simultaneous transmission of data to the wireless devices by a node, if one of the different phase angles is applied to the precoding element.

4. Method according to claim 1, wherein all precoding elements of the precoding matrix represent a phase shifter being able to shift a phase of a symbol to be transmitted without changing an amplitude of the symbol.

5. Method according to claim 1, wherein an interference strength indicator is calculated for different phase angles applied to each precoding element of each precoding vector of the precoding matrix, wherein for each precoding element of each precoding vector a phase angle is selected corresponding to the calculated interference strength indicator indicating the lowest interference strength of all calculated interference strength indicators.

6. Method according to claim 1, wherein the different phase angles being applied to a precoding element are comprised by a predefined set of phase angles comprising an equidistant distribution of phase angles from 0 to $2\pi$.

7. Method according to claim 1, wherein an interference strength indicator is calculated based on a multiplication of a channel matrix and the precoding matrix, wherein the channel matrix is based on a channel state information received from the plurality of wireless devices.

8. Method according to claim 7, wherein an interference strength indicator is calculated based on a difference between an interference suppression matrix and a result of the multiplication of the channel matrix and the precoding matrix.

9. Method according to claim 8, wherein the interference suppression matrix is an identity matrix.

10. Method according to claim 8, wherein the interference suppression matrix is a weighted identity matrix, wherein interference strength indicators are calculated for different weighting values for the weighted identity matrix.

11. Method according to claim 8, wherein the interference suppression matrix is a diagonal matrix, wherein interference strength indicators are calculated for different sets of diagonal elements of the diagonal matrix.

12. Method according to claim 1, wherein the precoding matrix is determined based on $$P_{CM} = \underset{P \in \Pi}{\operatorname{argmin}} \|\hat{H}_{\mathit{eff}} P - I\|_F^2; \Pi = \{P \in \mathbb{C}^{M \times D} \mid [P]_{i,k} = e^{j\theta_{i,k}}; \theta_{i,k} \in [0, 2\pi[\}$$

$$(P_{CM}, a_{CM}) = \underset{P \in \Pi, a \in \mathcal{R}_+}{\operatorname{argmin}} \|\hat{H}_{\mathit{eff}} P - aI\|_F^2;$$

$$\Pi = \{P \in \mathbb{C}^{M \times D} \mid [P]_{i,k} = e^{j\theta_{i,k}}; \theta_{i,k} \in [0, 2\pi[\},$$

or $$(P_{CM}, D_{CM}) = \underset{\substack{P \in \Pi, \\ D=diag(d_1,\ldots,d_D)}}{\mathrm{argmin}} \left\| \hat{H}_{\mathit{eff}} P - D \right\|_F^2;$$

$$\Pi = \{ P \in \mathbb{C}^{M \times D} \mid [P]_{i,k} = e^{j\theta_{i,k}}; \theta_{i,k} \in [0, 2\pi[ \}$$

wherein $P_{CM}$ is the precoding matrix to be determined, $\hat{H}_{\mathit{eff}}$ is a channel matrix based on a channel state information received from the plurality of wireless devices, P is a precoding matrix considering a specific phase angle of the different phase angles for a precoding element, I is an identity matrix, $\Pi$ is a set of precoding matrices considering different phase angles, a is a weighting factor, D is a diagonal matrix with elements $d_1$-$d_D$, $e^{j\theta_{i,k}}$ is a precoding element, $\theta_{i,k}$ is a phase angle, $\alpha_{CM}$ is a weighting factor corresponding to an interference strength indicator indicating the lowest interference strength, $D_{CM}$ is a diagonal matrix corresponding to an interference strength indicator indicating the lowest interference strength and $\|\hat{H}_{\mathit{eff}}P - D\|_F^2$ is an interference strength indicator.

13. Method according to claim 1, further comprising precoding the symbols to be transmitted to the plurality of wireless devices with the precoding matrix applying the selected phase angle for the precoding element of the precoding vector.

14. Apparatus for determining a precoding matrix for precoding symbols to be transmitted to a plurality of wireless devices by a node of a wireless communication system, wherein the precoded matrix comprises a precoding vector for each wireless device of the plurality of wireless devices, wherein each precoding vector comprises a precoding element for each transmit antenna of a plurality of transmit antennas of the node, wherein each precoding element represents a phase shifter being able to shift a phase of a symbol to be transmitted through the corresponding transmit antenna to the corresponding wireless device by a phase angle, the apparatus comprising:
   a processor configured to calculate a plurality of interference strength indicators for different phase angles, wherein the different phase angles are applied successively to a precoding element of a precoding vector, wherein an interference strength indicator is calculated based on a precoding matrix comprising the precoding element considering the respective different phase angle,
   wherein the processor is configured to select for the precoding element of the precoding vector a phase angle corresponding to a calculated interference strength indicator fulfilling a predefined interference strength criterion.

15. Computer program stored on a non-transitory computer readable medium with a program code for performing the method for determining a precoding matrix for precoding symbols to be transmitted to a plurality of wireless devices by a node of a wireless communication system, wherein the precoding matrix comprises a precoding vector for each wireless device of the plurality of wireless devices, wherein each precoding vector comprises a precoding element for each transmit antenna of a plurality of transmit antennas of the node, wherein each precoding element represents a phase shifter being able to shift a phase of a symbol to be transmitted through the corresponding transmit antenna to the corresponding wireless device by a phase angle, the method comprising:
   calculating a plurality of interference strength indicators for different phase angles, wherein the different phase angles are applied successively to a precoding element of a precoding vector for the calculation of the interference strength indicators, wherein an interference strength indicator is calculated based on a precoding matrix comprising the precoding element considering the respective different phase angle; and
   selecting for the precoding element of the precoding vector a phase angle corresponding to a calculated interference strength indicator fulfilling a predefined interference strength criterion,
   wherein the computer program runs on a computer or a microcontroller.

* * * * *